United States Patent
Batsa et al.

(10) Patent No.: US 11,351,664 B2
(45) Date of Patent: Jun. 7, 2022

(54) ELECTRICALLY ISOLATED TOOL WITH NON-CONDUCTIVE TORQUE TRANSFER COMPONENT

(71) Applicant: APEX BRANDS, INC., Apex, NC (US)

(72) Inventors: Stephen M. Batsa, Lexington, SC (US); Chad Aaron Miley, Camden, OH (US); James Spaulding, Lexington, SC (US); Rolf DeSwardt, Blythewood, SC (US)

(73) Assignee: Apex Brands, Inc., Apex, NC (US)

( * ) Notice: Subject to any disclaimer, the term of this patent is extended or adjusted under 35 U.S.C. 154(b) by 0 days.

(21) Appl. No.: 17/601,299

(22) PCT Filed: Apr. 3, 2020

(86) PCT No.: PCT/US2020/026592
§ 371 (c)(1),
(2) Date: Oct. 4, 2021

(87) PCT Pub. No.: WO2020/206264
PCT Pub. Date: Oct. 8, 2020

(65) Prior Publication Data
US 2022/0088754 A1 Mar. 24, 2022

Related U.S. Application Data

(60) Provisional application No. 62/829,202, filed on Apr. 4, 2019.

(51) Int. Cl.
*B25B 23/00* (2006.01)
*B25B 13/06* (2006.01)

(52) U.S. Cl.
CPC .......... *B25B 23/0035* (2013.01); *B25B 13/06* (2013.01)

(58) Field of Classification Search
CPC ....... B25B 13/06; B25B 13/065; B25B 13/00; B25B 13/48; B25B 23/0035;
(Continued)

(56) References Cited

U.S. PATENT DOCUMENTS

| | | |
|---|---|---|
| 2,025,838 A | 12/1935 | Leir |
| 2,457,451 A | 12/1948 | Domack |

(Continued)

FOREIGN PATENT DOCUMENTS

| | | |
|---|---|---|
| CA | 2231130 C | 2/2002 |
| CN | 2062679 U | 9/1990 |

(Continued)

OTHER PUBLICATIONS

International Search Report and Written Opinion from related international application PCT/US2020/026592, dated Jul. 21, 2020, all pages cited in its entirety.

(Continued)

*Primary Examiner* — David B. Thomas
(74) *Attorney, Agent, or Firm* — Burr & Forman, LLP

(57) ABSTRACT

An electrically isolated coupler includes a drive body, a driven body, and a torque transfer assembly. The drive body is made of first metallic material and has a drive end configured to interface with a fastening component. The drive body includes a first interface portion and the driven body includes a second interface portion. The driven body is made of a second metallic material and has a driven end configured to interface with a driving tool. The torque transfer assembly is disposed between the drive body and the driven body to electrically isolate the drive body and the driven body from each other and transfer torque between the drive body and the driven body. The torque transfer assem- (Continued)

bly includes non-conductive material configured to maintain separation between the drive body and the driven body of at least about 0.400".

17 Claims, 4 Drawing Sheets

(58) Field of Classification Search
CPC ................ B29C 45/0001; F16D 1/101; F16D 2001/103; F16D 3/00; F16D 3/64; F16D 3/68
See application file for complete search history.

(56) References Cited

U.S. PATENT DOCUMENTS

| | | | |
|---|---|---|---|
| 2,476,762 A | 7/1949 | Petre et al. | |
| 3,859,821 A | 1/1975 | Wallace | |
| 3,873,863 A | 3/1975 | Pew | |
| 3,868,874 A | 4/1975 | Olashaw | |
| 5,485,769 A | 1/1996 | Olson et al. | |
| 5,970,826 A | 10/1999 | Iwinski et al. | |
| 6,029,547 A | 2/2000 | Eggert et al. | |
| 6,126,882 A | 10/2000 | Iwinski et al. | |
| 6,295,904 B1 | 10/2001 | Webb | |
| 6,962,098 B2 | 11/2005 | Eggert et al. | |
| 7,077,037 B2 | 7/2006 | Shevela et al. | |
| 7,841,261 B2 | 11/2010 | Milligan et al. | |
| 7,882,769 B2 | 2/2011 | Lin | |
| 9,144,893 B2 | 9/2015 | Su | |
| 9,863,191 B1 * | 1/2018 | Ide | E21B 4/003 |
| 10,435,954 B1 * | 10/2019 | Ide | E21B 17/03 |
| 10,675,738 B2 | 6/2020 | Heitkamp | |
| 10,753,159 B1 * | 8/2020 | Ide | E21B 4/02 |
| 10,906,161 B2 * | 2/2021 | Xu | F16D 3/76 |
| 11,027,400 B2 * | 6/2021 | Raskin | F16D 3/64 |
| 2008/0309444 A1 | 12/2008 | Sorg et al. | |
| 2012/0042754 A1 | 2/2012 | Chen | |
| 2012/0060656 A1 | 3/2012 | Chang | |
| 2013/0341069 A1 | 12/2013 | Demaretz | |
| 2016/0082582 A1 | 3/2016 | Barker | |
| 2017/0106701 A1 | 4/2017 | Ito | |

FOREIGN PATENT DOCUMENTS

| | | |
|---|---|---|
| CN | 2073351 U | 3/1991 |
| CN | 101121259 A | 2/2008 |
| CN | 201963668 U | 9/2011 |
| CN | 103029088 A | 4/2013 |
| CN | 203726391 U | 7/2014 |
| CN | 204226465 U | 3/2015 |
| DE | 202018102624 U1 | 5/2018 |
| DE | 102018118335 A1 | 1/2020 |
| EP | 2240083 A1 | 3/1975 |
| EP | 0747179 A1 | 12/1996 |
| EP | 0861139 A1 | 9/1998 |
| WO | 1998027654 | 6/1998 |
| WO | 2017106701 A1 | 6/2017 |
| WO | 20170106701 A1 | 6/2017 |
| WO | 2018204468 A1 | 11/2018 |

OTHER PUBLICATIONS

First Office Action from related Chinese application No. 201680081860.X dated Jun. 3, 2019, all enclosed pages cited.
International Search Report and Written Opinion of PCT/US2016/067256 dated May 17, 2017, all enclosed pages cited.
Chapter 1 International Preliminary Report on Patentability of PCT/US2016/067256 dated Jun. 19, 2018, all enclosed pages cited.
Office action from related Chinese application No. 201880029152.0, dated Jun. 10, 2020, all pages cited in its entirety.
International Search Report and Written Opinion of PCT/US2016/067256 dated Jun. 19, 2018, all enclosed pages cited.
International Search Report and Written Opinion of international application No. PCT/US2019/038668 dated Oct. 1, 2019 all enclosed pages cited.
European Search Report from related European Application No. 19207774.1 dated Mar. 3, 2020, all enclosed pages cited.
International Search Report and Written Opinion of international application No. PCT/US2020/018041 dated May 4, 2020, all enclosed pages cited.
Office action from related Australian application No. 2019295630, dated Jun. 2, 2021, all pages cited in its entirety.
Office action from related Chinese application No. 201911334764.3, dated Jan. 4, 2021, all pages cited in its entirety.
Office action from related Mexican application No. MX/a/2020/012109, dated Jan. 21, 2021, all pages cited in its entirety.
International Search Report and Written Opinion of international application No. PCT/US2018/030603 dated Aug. 17, 2018, all enclosed pages cited.
Office action from related Chinese application No. 202010400526.4, dated Apr. 27, 2021, all pages cited in its entirety.
Office action from related U.S. Appl. No. 17/055,714 dated Sep. 21, 2021, all pages cited in its entirety.
Office action from related U.S. Appl. No. 16/607,133 dated Jan. 13, 2021, all pages cited in its entirety.
Office action from related Chinese application No. 202010400526.4 dated Oct. 18, 2021, all pages cited in its entirety.

* cited by examiner

ELECTRICALLY ISOLATED TOOL WITH NON-CONDUCTIVE TORQUE TRANSFER COMPONENT

CROSS-REFERENCE TO RELATED APPLICATIONS

This application claims the benefit of U.S. Provisional application No. 62/829,202, filed on Apr. 4, 2019, the entire contents of which are hereby incorporated by reference.

TECHNICAL FIELD

Example embodiments generally relate to driving devices such as socket tools, bit holders and other fastener driving components. In particular, example embodiments relate to an electrically isolated coupling and a torque transfer component that can be used with such driving components to enable safe use in environments where work occurs around electrically charged components.

BACKGROUND

Socket tools, such as socket wrenches, are familiar tools for fastening nuts and other drivable components or fasteners. The sockets of these tools are generally removable heads that interface with the socket wrench on one side and interface with one of various different sizes of nut or other fastener on the other side. Because high torque is often applied through these tools, and high strength and durability is desirable, the sockets are traditionally made of a metallic material such as iron or steel. However, metallic materials can also corrode or create spark or shock hazards when used around electrically powered equipment.

Although it may be possible to coat a metallic socket in a material that is non-conductive, such material is typically not suitable for coverage of either the driving end of the socket (i.e., the end that interfaces with the wrench) or the driven end of the socket (i.e., the end that interfaces with the nut or other fastener being tightened by the socket wrench) directly contacting the driving tool or fastener. In this regard, the high torque and repeated contact with metallic components would tend to wear such materials away over time and degrade the performance of the tool. Thus, it is most likely that the ends of the socket directly contacting the driving tool or fastener would remain (or revert to) exposed metallic surfaces resulting in the socket potentially conducting electricity and becoming a shock or spark hazard.

Accordingly, a number of designs had been provided for electrical isolation of sockets or other couplers/adapters. However, these designs often simply provide an isolation material between opposing metal portions of the drive and driven ends. This can provide one or more weak points where the isolation material is unsupported and can fail under high torque loads. Thus, it may be desirable to provide a mechanism for strengthening the coupling between the isolated metal components without sacrificing isolation characteristics.

BRIEF SUMMARY OF SOME EXAMPLES

Some example embodiments may enable the provision of a coupling device that includes a driven end and driving end that are electrically isolated via an isolation material. However, example embodiments may further include a torque transfer component disposed between the isolated driven end and drive end. The coupling device may be used as an adaptor for driving any selected socket, bit holder, and/or the like, even if such socket/bit holder is not electrically isolated. Given that the coupling device employs electrical isolation, existing (non-electrically isolated) fastener driving components can be used in proximity to electrical components based on the isolation provided by the coupling device.

In an example embodiment, an electrically isolated coupler is provided. The electrically isolated coupler may include a drive body, a driven body, and a torque transfer assembly. The drive body may be made of first metallic material and has a drive end configured to interface with a fastening component. The drive body may include a first interface portion and the driven body includes a second interface portion. The driven body may be made of a second metallic material and has a driven end configured to interface with a driving tool. The torque transfer assembly may be disposed between the drive body and the driven body to electrically isolate the drive body and the driven body from each other and transfer torque between the drive body and the driven body. The torque transfer assembly may include non-conductive material configured to maintain separation between the drive body and the driven body of at least about 0.400".

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1A:
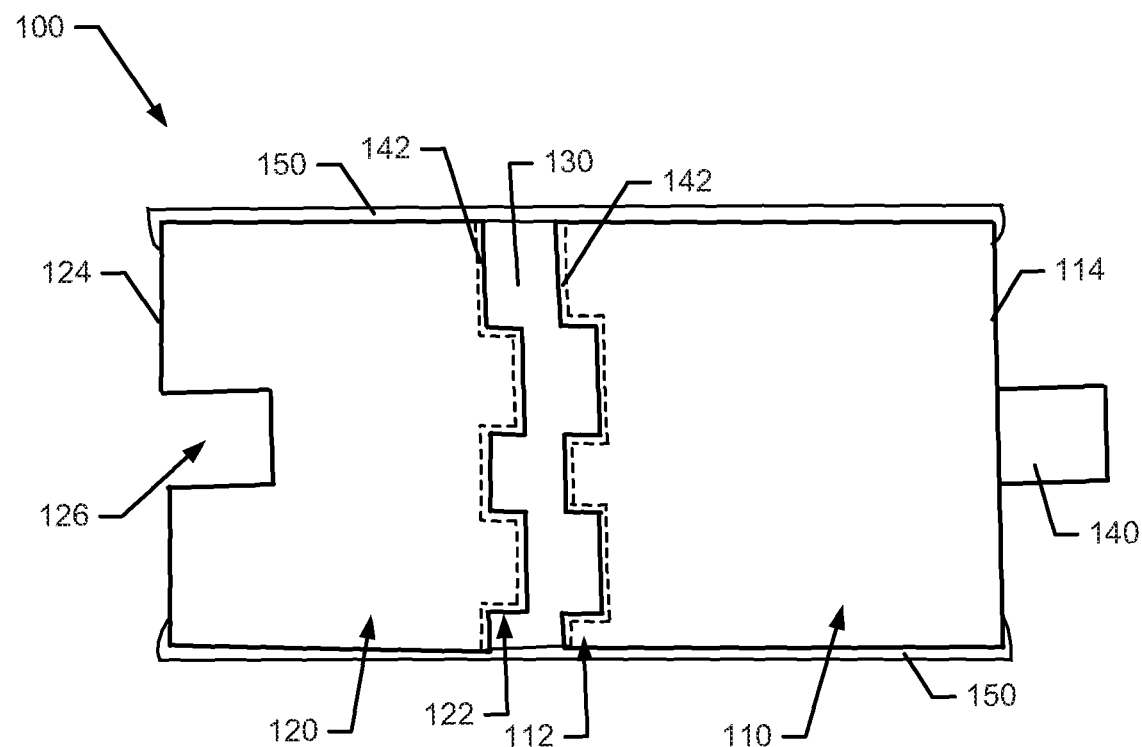
FIG. 1A is a cross section, side view of an electrically isolated coupler according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of electrically isolated fastener driving tools that can be used in proximity to powered components or components that have an electrical charge. In some cases, the user can safely work on or around such components or systems without having to de-energize the system. The electrical isolation provided may eliminate the risk of surge currents traveling from a fastener to a socket tool, bit driver or other fastener driving tool (such as a socket wrench or a power tool that drives sockets, bits, etc.). Particularly for power tools that include electronic components that log data about power tool usage, the isolated coupling of example embodiments can protect valuable computer data such as recorded torque information on fasteners and run-down count history for estimating power tool life.

Some tools are used in energized environments that involve relatively low voltages. Isolation for such low voltages can be accomplished with relatively small amounts of insulating material being disposed between the drive end and the driven end of the coupler in these instances. Thus, the coupler can be made with relatively small increases in length or width, and any number of specific structures (each with different advantages/disadvantages) could be employed to execute the isolation. However, when high voltage applications are envisioned (e.g., working on equipment rated for voltage levels in excess of 1,000 V (and tested to 10,000 V)), separation between metallic components must be maintained at least at minimum levels (e.g., greater than four hundred thousandths of an inch or 0.400"). This can create a substantial constraint that reduces torque ratings that are achievable for a coupler designed to be used at such levels. Alternatively, the length and/or width of the coupler may have to be drastically increased to achieve the necessary isolation at desirable torque ratings.

Example embodiments may provide a number of structural options for reinforcement of coupler components so that high voltage applications can be supported while still enjoying high torque ratings and not drastically lengthening or widening coupler sizes. Thus, a coupler that can be used safely at a wide variety of voltage levels, and is still sized such that the coupler is comfortable for use in any application may be provided. Such coupler may, moreover, be considered to be a "universal" coupler since the coupler may be used for applications involving wide ranges voltage and torque that effectively make the coupler useable for nearly every application.

As will be discussed below, example embodiments may generally achieve reinforcement without sacrificing isolation by the insertion of a non-conductive torque transfer part between a drive body and a driven body that are otherwise electrically isolated from each other with spacing of at least 0.400". Some structures that can employ example embodiments will now be described below by way of example and not limitation.

FIG. 1A illustrates a side view of an electrically isolated adapter 100 in cross section according to an example embodiment. The adapter 100 includes a drive body 110 and driven body 120 separated from each other by a torque transfer assembly 130 that is disposed therebetween. The torque transfer assembly 130 of this example may be a rigid component that is formed to fit any structural features provided on the faces of the drive body 110 and driven body 120 that face each other. In this example, the drive body 110 may have an interface portion 112 facing the driven body 120, and the interface portion 112 may be formed by a plurality of castle teeth or other projections that extend rearward and toward the driven body 120. The driven body 120 may similarly include an interface portion 122 facing the drive body 110. The interface portion 122 of the driven body 120 may also include castle teeth or other projections that extend forward and toward the drive body 110. Meanwhile, the torque transfer assembly 130 may be formed to receive the castle teeth or projections of each of the interface portions 112 and 122 of the drive body 110 and driven body 120, respectively.

The drive body 110 and driven body 120 may each be made of steel or another rigid metallic material. Steel and most other rigid metals generally have a low resistance to electrical current passing therethrough. The drive body 110 and the driven body 120 may be designed such that, when assembled into the adapter 100, the drive body 110 and the driven body 120 do not contact each other. Moreover, as discussed above, the drive body 110 and the driven body 120 may be maintained a distance of at least 0.400" apart from each other at all points thereof in order to enable high voltage isolation. The torque transfer assembly 130 may therefore be sized and shaped to accomplish this separation, and may be made of non-conductive material. Depending on the specific geometry of the torque transfer assembly 130, a thickness of greater than 0.500" can lead to excessive deformation of the torque transfer assembly 130. Accordingly, in one embodiment the thickness of the torque transfer assembly 130 is between 0.400" and 0.500", while in another embodiment the thickness of the torque transfer assembly 130 is 0.450"."

As discussed above, a size and shape of the torque transfer assembly 130 may be designed to provide sufficient separation to achieve high voltage isolation, and the torque transfer assembly 130 may be made of non-conductive material. However, in some embodiments, the non-conductive material chosen for the torque transfer assembly 130 may be rigid material that allows relatively high torque transfer. In this regard, some materials with good isolation properties (e.g., plastics, nylon, or other moldable materials) may be relatively easy to work with and even enable injection molding in connection with reinforcement materials. However, softer, injectable materials may have lower torque ratings that more rigid materials. As such, in at least some cases, the torque transfer assembly 130 may be separately formed (i.e., not injected) from the drive body 110 and the driven body 120 to enable more rigid materials to be used in the torque transfer assembly 130. In particular, in some cases, the torque transfer assembly 130 may be a non-conductive metallic material or other composite material that, although quite strong, does not conduct electricity. For example, the torque transfer assembly 130 could be made of aluminum or hard nylon in some cases. However, other rigid and non-conducting materials could be used in other examples.

The drive body 110 and the driven body 120 may be oriented such that a drive end 114 of the drive body 110 and a driven end 124 of the driven body 120 face in opposite directions. Axial centerlines of each of the drive body 110 and the driven body 120 are aligned with each other and with a longitudinal centerline of the adapter 100. The drive body 110 may include a drive head 140, which faces away from the driven body 120 and protrudes out of the front end of the drive body 110. The drive head 140 may be configured to interface with a socket, a fastener, or any other component having a receiving opening that is complementary to the shape of the drive head 140. In this example, the drive head 140 is a drive square. However, other shapes for the drive head 140 are also possible, and in some cases, the drive head 140 could be replaced with a socket. In some embodiments, a ball plunger may be disposed on a lateral side of the drive head 140 to engage with a ball detent disposed on a socket or other component.

The driven body 120 may take the form of a cylinder, similar to the drive body 110. However, instead of having the drive head 140, the driven body 120 may include a drive receiver 126 formed at a rear end thereof. The drive receiver 126 may be aligned with the drive head 140 and both the drive head 140 and the drive receiver 126 may be aligned with an axis of the adapter 100. In this example, the drive receiver 126 may be shaped to fit a drive square of a wrench (e.g., a socket wrench) or other driving tool. However, the drive receiver 126 could be shaped to fit any drive member of any other type of driving tool as well.

Although not required, either one or both of the drive body 110 and the driven body 120 may include foil inserts or other insulating layers 142 formed at the outer faces of the interface portions 112 and 122, respectively. Such insulating layers 142 may be made of non-conductive foils, fluorographene, or other nano-materials. The insulating layers 142, if employed, may provide additional electrical isolation in some cases.

In an example embodiment, once the drive body 110, the driven body 120, and the torque transfer assembly 130 have been fitted together, an overmold or sleeve 150 may be applied to hold all such components together. However, it should be appreciated that adhesives may also be used to facilitate holding such components together as well in some cases. The sleeve 150 may be formed using a molding process, and may be formed of soft nylon, plastic or other material that is non-conductive, but also capable of protecting and axially binding the drive body 110 and the driven body 120 together. The sleeve 150 may also be configured to cover substantially all of the lateral edges of the drive body 110 and the driven body 120 to prevent user access to the torque transfer assembly 130 and/or the insulating layers 142.

The castle teeth or projections of the interface portion 122 of the driven body 120 may or may not be in alignment with the projections of the interface portion 112 of the drive body 110. In this regard, due to the presence and construction of the torque transfer assembly 130, any desirable arrangement for formation of the projections or castle teeth on each member can be selected. As such, for example, preferential failure modes may be achieved by virtue of the size and/or shape of the projections or castle teeth on each respective component. Moreover, the sleeve 150 may, in some cases, be formed to allow one or both of the drive body 110 and the driven body 120 to rotate therein. Thus, when a preferential failure mode is achieved, although the failure has occurred, each of the drive body 110 and the driven body 120 may still be retained within the sleeve 150. However, one of the drive body 110 or driven body 120 may be enabled to rotate relative to the other so that no torque can effectively be transferred from the driven body 120 to the drive body 110. The operator can therefore clearly tell that the adapter 100 needs replacement. However, there would never be an opportunity for the drive end 110 to be stuck on an energized fastener, creating a dangerous situation for anyone trying to remove the broken off drive end 110 from the fastener.

Figure 1B:
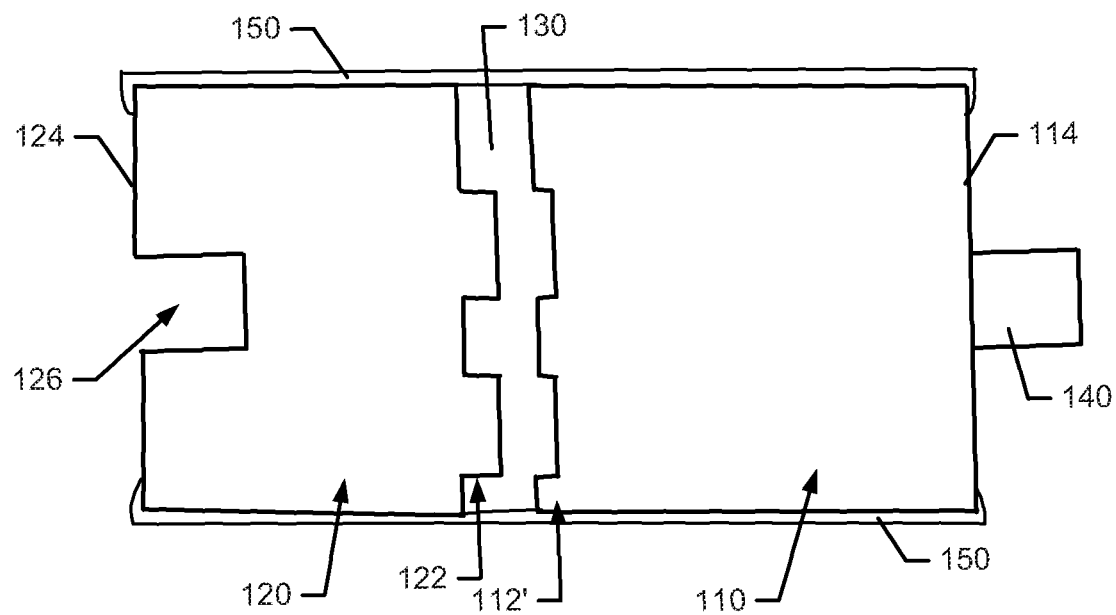
FIG. 1B is a side view of an alternate structure for the electrically isolated coupler aimed at dictating a preferred failure mode according to an example embodiment.

The provision of preferential failure modes can be achieved, as noted above, by changing the size and/or shape of the projections or castle teeth so that they are less prominent or aggressive on one of the interface portions (112 or 122) than on the other. In particular, for example, as shown in FIG. 1B, the castle teeth of the interface portion 112' on the drive body 110 are not as long as the castle teeth of the interface portion 122 of the driven body 120. Accordingly, it can be expected that if failure of the connection between the torque transfer assembly 130 and one of the drive body 110 or the driven body 120 should occur due to high torque, that failure would be far more likely to occur first at the interface portion 112' of the drive end 110. The drive end 110 may then remain stationary and fixed on the fastener or socket, and rotate within the sleeve 150 when the driven body 120 has torque applied thereto.

Figure 1C:
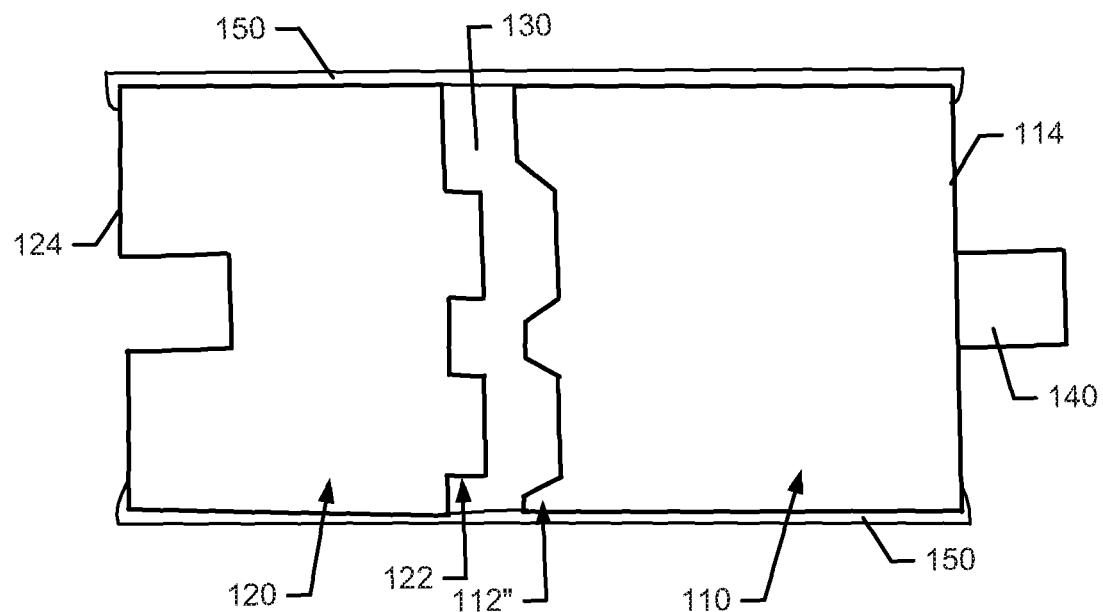
FIG. 1C is a side view of another alternate structure for dictating failure mode in the electrically isolated coupler according to an example embodiment.

FIG. 1C illustrates an example in which, instead of changing the length of the castle teeth, the angles of the castle teeth are reduced (to something less than 90 as they extend away from the drive body 110). This reduction in slope of the castle teeth (or other projections) creates a less aggressive gripping force between the torque transfer assembly 130 and the drive body 110. A similar effect can be achieved by rounding corners instead of changing slope. Thus, again, it can be expected that if failure of the connection between the torque transfer assembly 130 and one of the drive body 110 or the driven body 120 should occur due to high torque, that failure would be far more likely to occur first at the interface portion 112" of the drive end 110. The drive end 110 may then remain stationary and fixed on the fastener or socket, and rotate within the sleeve 150 when the driven body 120 has torque applied thereto.

Figure 1D:
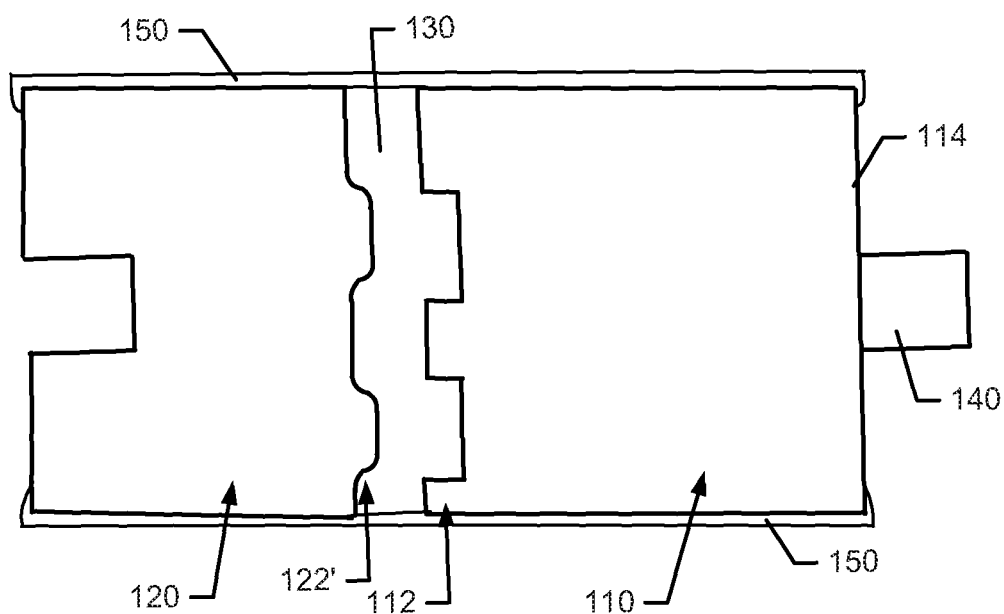
FIG. 1D is a side view of still another alternate structure for dictating failure mode in the electrically isolated coupler according to an example embodiment.

Finally, FIG. 1D is provided to show that the same strategy may be employed to the driven body 120 instead of the drive body 110. However, in this example, the interface portion 122 of the driven body 120 has been reduced in depth and also rounded in shape. Thus, it can be expected that if failure of the connection between the torque transfer assembly 130 and one of the drive body 110 or the driven body 120 should occur due to high torque, that failure would be far more likely to occur first at the interface portion 122' of the driven end 120. The drive end 110 may then remain stationary and fixed on the fastener or socket, and the driven end 120 will rotate within the sleeve 150 when the driven body 120 has torque applied thereto.

The examples of FIGS. 1A-1D may be enabled to provide high levels of isolation for a coupler configured to be used with high torque and high voltages. As can be appreciated from the descriptions above, the torque transfer assembly 130 may be instrumental in providing these advantages. However, other specific structures may be employed for coupling assemblies that may provide similar advantages. For example, FIG. 2 is a side view of an alternative torque transfer assembly structure of an electrically isolated coupler 200 according to an example embodiment.

Figure 2:
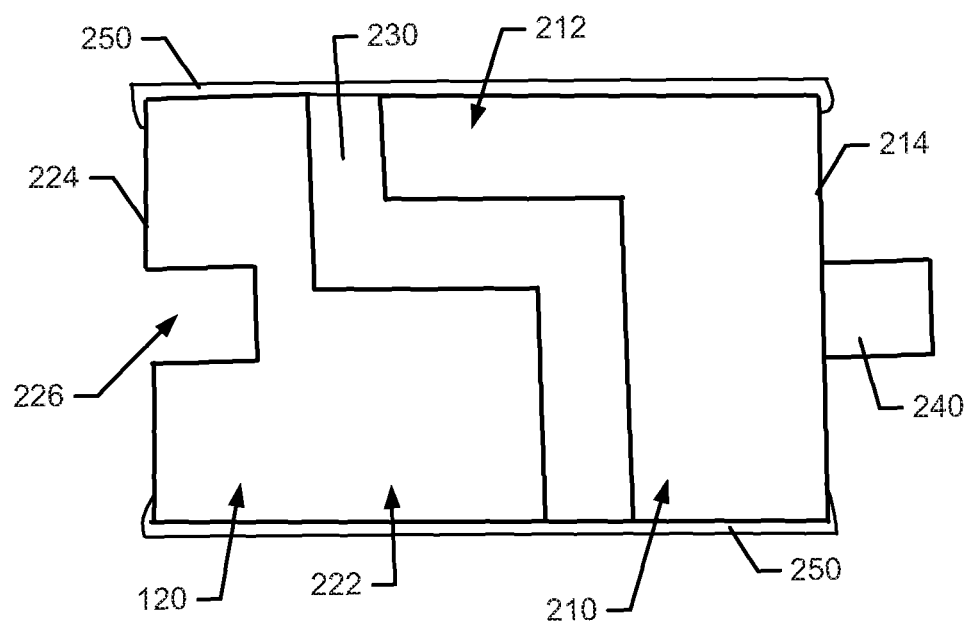
FIG. 2 is a side view of an alternative assembled structure of an electrically isolated coupler according to an example embodiment.

As shown in FIG. 2, the coupler 200 may include a drive end 210 and a driven end 220 that are arranged as described above except that the interface portion 212 of the drive end 210 and the interface portion 222 of the driven end 220 are substantially differently structured than the example above. However, other structures of the coupler 200 and the coupler 100 of FIGS. 1A-1D may be similar in function and sometimes also in form. Thus, the drive end 214, the driven end 224, the drive head 240, drive receiver 226, and the sleeve 250 may be similar in form and/or function to the drive end 114, the driven end 124, the drive head 140, the drive receiver 126 and the sleeve 150 described above. However, due to the different shapes of the interface portions 212 and 222, the torque transfer assembly 230 may also have a substantially different shape than the torque transfer assembly 130 of FIGS. 1A-1D.

As shown in FIG. 2, the interface portions 212 and 222 may each include protrusions that extend into a receiving portion of the opposing one of the interface portions 212 and 222. Meanwhile, the torque transfer assembly 230 may be a non-conductive metallic member similar in composition to the torque transfer assembly 130 described above. However, other strong non-conductive materials could alternatively be employed in other embodiments. Moreover, although not specifically shown, insulating layers similar to insulating layers 142 above could be implemented on either or both of the interface portions 212 and 222. A thickness of the torque transfer assembly 230 (like torque transfer assembly 130) may be at least 0.400" at all portions thereof in order to ensure operability at high voltages.

Figure 3:
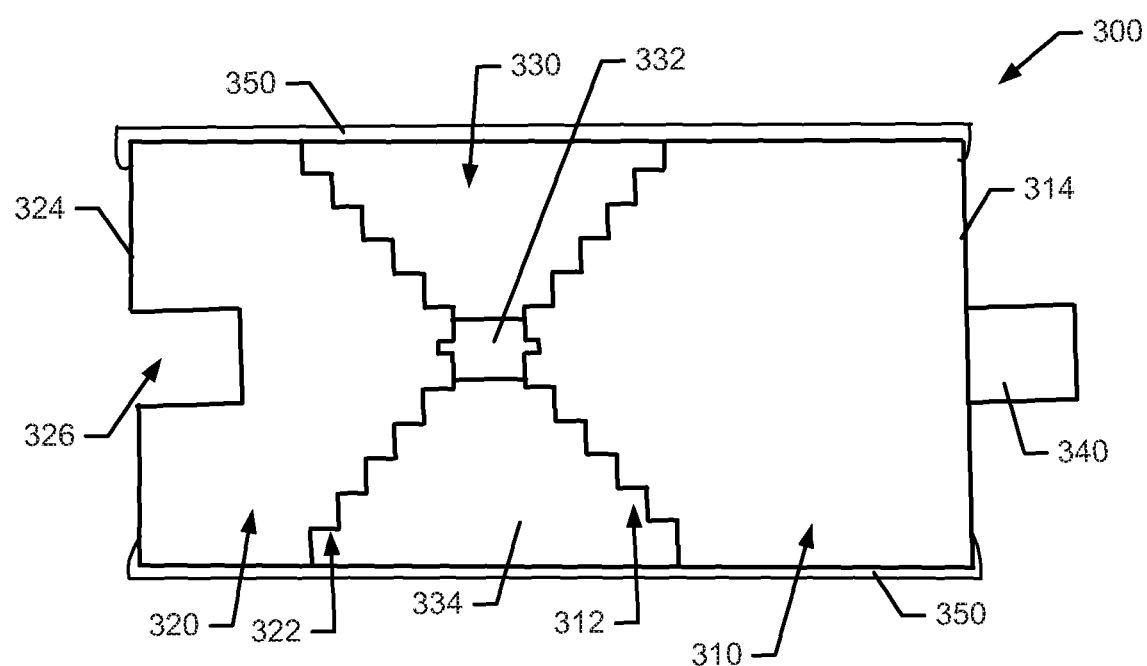
FIG. 3 is a cross section view of an alternate electrically isolated coupler according to an example embodiment.

In the examples of FIGS. 1A-1D and FIG. 2, the torque transfer assembly 130/230 may be made entirely of one material comprising a metallic or other hard non-conductive material shaped to fit between the drive body and driven body. However, in other embodiments, a torque transfer assembly may be formed from a collection of components including components having different characteristics. FIG. 3 illustrates one such example. In this regard, FIG. 3 illustrates a cross section view of a coupler 300 that again includes a drive body 310 and a driven body 320. Moreover, the drive end 314, the driven end 324, the drive head 340, drive receiver 326, and the sleeve 350 may be similar in form and/or function to the drive end 114, the driven end 124, the drive head 140, the drive receiver 126 and the sleeve 150 described above. However, due to the different shapes of interface portions 312 and 322, the coupler 300 may include a torque transfer assembly 330 that may also have a substantially different shape than the torque transfer assembly 130 of FIGS. 1A-1D or the torque transfer assembly 230 of FIG. 2.

Additionally, the shape of the interface portions 312 and 322 ultimately change the shape of the drive body 310 and the driven body 320. Moreover, it should be appreciated that the drive body 310 and 320 could have any of a number of different shapes (including lobular) and still practice example embodiments with respect to the torque transfer assembly 300. In the example of FIG. 3, the interface portions 312 and 322 are characterized by being sloped forward and rearward, respectively. As such, the width or thickness of the material forming the torque transfer assembly 330 increases as distance from the longitudinal centerline or axis of the coupler 300 increases. In this example, the interface portions 312 and 322 are formed as sequential steps and it should be appreciated that each step may be formed as a circular disc with increasing diameters to each respective disc as the distance forward (for the drive body 310) and rearward (for the driven body 320) increases. In some cases, these circular discs may further include knurling or fluting on the external surface thereof, and such knurling or fluting may be complemented by the corresponding portions of the torque transfer assembly 330 in order to increase the ability of the torque transfer assembly 330 to grip the drive body 310 and the driven body 320, respectively.

As discussed above, the knurling, fluting or any other texture provided on the interface portions 312 and 322 may be either the same or different on the drive body 310 and the driven body 320. Where the knurling, fluting or other textures are different, a preferential failure mode may be defined as described above. In this regard, the interface portion having the less prominent or aggressive knurls, fluting or texture may be expected to fail before the other. Then, due to the fact that the sleeve 350 extends beyond the longitudinal ends of the drive body 310 and the driven body 320, the failed piece will still be retained within the coupler 300 although torque transfer will no longer be possible.

The torque transfer assembly 330 may include a core member 332 that bridges at least a portion of the distance between the drive body 310 and the driven body 320. The core member 332 may be made of non-conductive metal or another highly rigid material that is non-conductive. In some cases, the core member 332 may be substantially cylindrical in shape, but may have a knurled, fluted, toothed or otherwise discontinuous outer surface. A longitudinal length (i.e., aligned with the axis of the coupler 300) of the core member 332 (which may define a minimum separation between the drive body 310 and the driven body 320) may be at least 0.400" at all portions thereof in order to ensure operability at high voltages.

The torque transfer assembly 330 may also include a molded portion 334 that may include fiber reinforced plastics, nylon or other materials. The molded portion 344 may conform to the knurls, fluting, correction or texture on both the interface portions 312 and 322 and the core member 332 to grip the same, and enable efficient torque transfer from the driven body 320 to the drive body 310. In some cases, a largest amount of torque may be experienced at or near the external edges of the coupler 300 due to the length of the moment arm at such locations. Accordingly, by providing a thicker amount of material in the molded portion 332 near the outer edges thereof, improved performance may be achieved.

Figure 4:
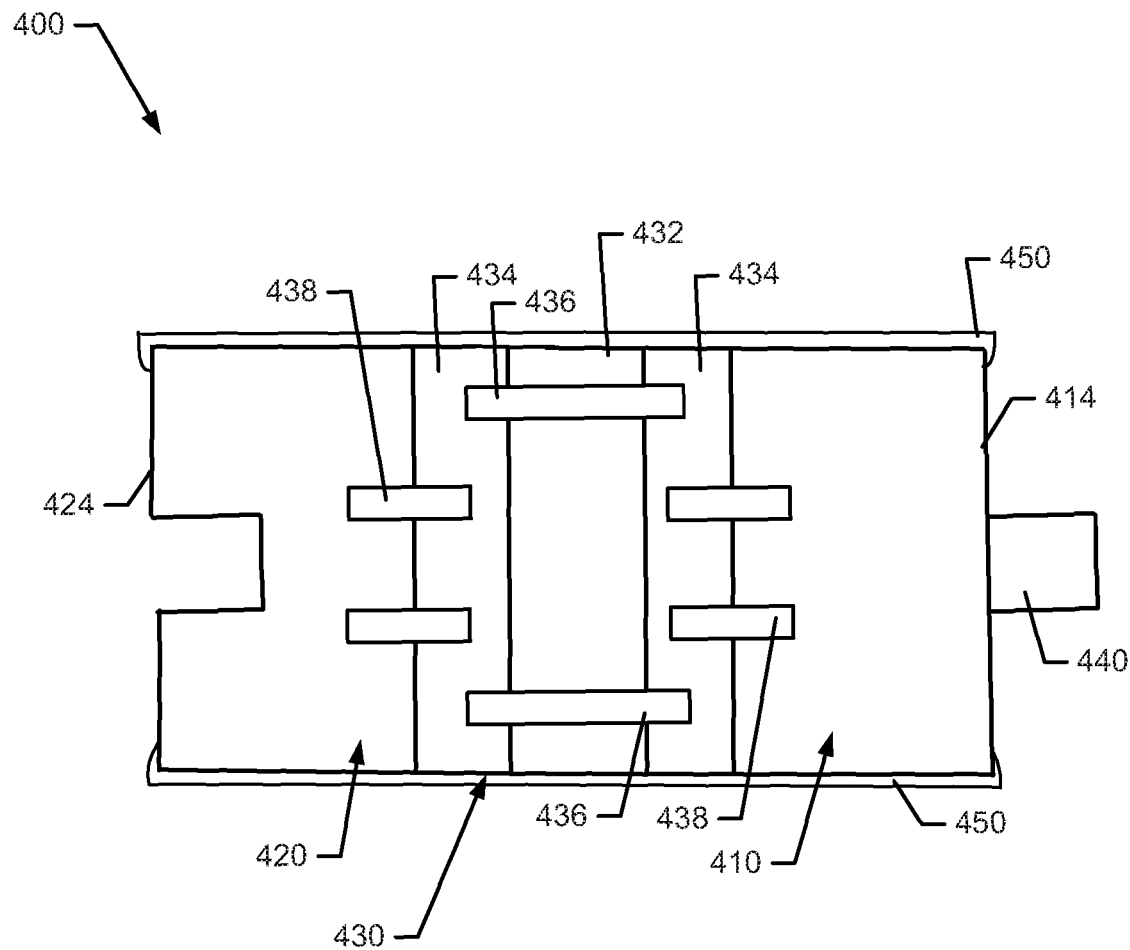
FIG. 4 illustrates a cross section view of another electrically isolated socket according to an example embodiment.

In each of the examples above, the torque transfer assembly 130/230/330 acts as a torque transfer part that is inserted between the drive end 110/210/310 and the driven end 120/220/320. Moreover, although the torque transfer assembly 130/230/330 is non-conductive, the torque transfer assembly 130/230/330 can include non-conductive metals or other hard materials (e.g., not molded) that form at least a portion thereof. In the examples of FIGS. 1A-1D and 2, the torque transfer assembly 130/230 may be formed almost entirely of non-conductive metal or another highly rigid material that is not molded. However, in the example of FIG. 3, the non-conductive metal or highly rigid material may only form a core portion of the torque transfer assembly 330. However, defining a torque transfer assembly using non-conductive metal or highly rigid (even metallic) portions could also be provided in some cases. FIG. 4 illustrates such an example.

Referring now to FIG. 4, another alternative design for a coupler 400 is shown. The coupler 400 again includes a drive body 410 and a driven body 420. In this example, the drive body 410 and driven body 420 may be substantially cylindrical in shape. However, it should be appreciated that the drive body 410 and driven body 420 could also be lobular, or take other shapes in some cases. That said, in this case, the cylindrical nature of the drive body 410 and driven body 420 adds simplicity to the design, as will be apparent from the descriptions below.

In an example embodiment, the drive end 414, the driven end 424, the drive head 440, drive receiver 426, and the sleeve 450 may be similar in form and/or function to the drive end 114, the driven end 124, the drive head 140, the drive receiver 126 and the sleeve 150 described above. Meanwhile, torque transfer assembly 430 may be made of a collection of components that interact with each other to conduct torque transfer between the drive body 410 and the driven body 420 while also electrically isolating the drive body 410 from the driven body 420. In this regard, for example, the torque transfer assembly 430 may include a first isolation member 432 in the form of a disc or plate shaped member made of non-conducting material. The first isolation member 432 may be surrounded on opposite sides thereof be two instances of a second isolation member 434. Each instance of the second isolation member 434 may interface with a respective one of the drive body 410 and the driven body 420.

The torque transfer assembly 430 may further include first reinforcement members 436 that operably couple the first isolation member 432 to each of the instances of the second isolation member 434. Thus, in this example, the first reinforcement members 436 may pass entirely through the first isolation member 432 and extend into each of the second isolation members 434 on respective opposing sides of the first isolation member 432. A number of the first reinforcement members 436 may be distributed (e.g., equidistant from the axis) spaced apart from each other at regular intervals. The first reinforcement members 436 may facilitate torque transfer from the first isolation member 432 to each of the second isolation members 434. Second reinforcement members 438 may then be used to facilitate torque transfer from each of the second isolation members 434 to a respective one of the drive body 410 and the driven body 420. In this regard, some of the second reinforcement members 438 may extend into each of the drive body 410 and a corresponding one of the second isolation members 434 while others of the second reinforcement members 438 may extend into each of the driven body and the corresponding other one of the second isolation members 434. The second isolation members 438 may also be distributed (e.g., equidistant from the axis) spaced apart from each other at regular intervals. Both the first and second isolation members 436 and 438 may be elongated rods or other such members that are made of materials having a higher hardness or rigidity than the material used for the first and second isolation members 432 and 434.

In an example embodiment, a minimum separation between the drive body 410 and the driven body 420 may be at least 0.400" at all portions thereof. Thus, if all of the first isolation member 432, the second isolation members 434, the first reinforcement members 436, and the second reinforcement members 438 are made of non-conductive material (e.g., non-conductive metal or other material such as nylon, plastic, etc.), then the combined axial lengths of the first isolation member 432, the second isolation members 434 may be about 0.400". However, in some embodiments, the reinforcement members could be metallic components. In such an example, no distance between any portion of one of the reinforcement members and either another reinforcement member or the drive body 410 or driven body 420 may be less than about 0.400" in order to ensure operability at high voltages.

The first and second isolation members 432 and 434 may be made of the same non-conducting material or different non-conductive materials in alternate example embodiments. When the materials are different, the different materials may be selected to have different dielectric strengths, different hardness, or various other different characteristics to facilitate achievement of design objectives. Materials used for the first and second isolation members 432 and 434 may include, for example, nylon, rubber, plastic, resin, or other such materials that are non-conductive.

Accordingly, an electrically isolated coupler of an example embodiment may be provided. The electrically isolated coupler may include a drive body, a driven body, and a torque transfer assembly. The drive body may be made of first metallic material and has a drive end configured to interface with a fastening component. The drive body may include a first interface portion and the driven body includes a second interface portion. The driven body may be made of a second metallic material and has a driven end configured to interface with a driving tool. The torque transfer assembly may be disposed between the drive body and the driven body to electrically isolate the drive body and the driven body from each other and transfer torque between the drive body and the driven body. The torque transfer assembly may include non-conductive material configured to maintain separation between the drive body and the driven body of at least about 0.400".

In some embodiments, the coupler may include additional, optional features, and/or the features described above may be modified or augmented. Some examples of modifications, optional features and augmentations are described below. It should be appreciated that the modifications, optional features and augmentations may each be added alone, or they may be added cumulatively in any desirable combination. In an example embodiment, the torque transfer assembly may include non-conductive metal. In some cases, the non-conductive metal may form a core member at an axial center of the torque transfer assembly. In an example embodiment, an entirety of the torque transfer assembly may be formed from the non-conductive metal. In some cases, the coupler may further include a foil layer disposed between the non-conductive metal and at least one of the drive body or the driven body. In an example embodiment, the torque transfer assembly may include a first isolation member and at least one second isolation member, and the first and second isolation members may be formed as disc or plate shaped members inserted between the drive body and the driven body. In some cases, the first isolation member and the at least one second isolation member are each made of different materials. In an example embodiment, the first isolation member and the at least one second isolation member may be operably coupled to each other via reinforcement members. In some cases, the reinforcement members are disposed equidistant from each other and from an axial center of the electrically isolated coupler. In an example embodiment, the reinforcement members may include a first set of reinforcement members extending entirely through the first isolation member and into each of a first instance and a second instance of the at least one second isolation member, where the first and second instances are disposed on opposite sides of the first isolation member. In some cases, the reinforcement members may include a second set of reinforcement members, some of which extend between the first instance of the at least one second isolation member and the drive body and others of which extend between the second instance of the at least one second isolation member and the driven body. In an example embodiment, the first set of reinforcement members may be disposed farther from an axial center of the electrically isolated coupler than the second set of reinforcement members. In some cases, sides of each of the drive body and the driven body may taper inwardly toward an axial center of the electrically isolated coupler as the drive body and the driven body extent toward each other to form tapered sides. In an example embodiment, the tapered sides may include engagement features, and engagement features of the drive body and the driven body may be different from each other. In some cases, an axial thickness of the torque transfer assembly may increase as distance from the axial center of the electrically isolated coupler increases. In an example embodiment, the first interface portion may be configured to interface with a first axial end of the torque transfer assembly, and the second interface portion may be configured to interface with a second axial end of the torque transfer assembly. In some cases, the first interface portion may have first engagement features and the second interface portion has second engagement features disposed on external surfaces thereof, and the first and second engagement features may be configured to define a preferred failure mode. In an example embodiment, the first engagement features may have a different slope than the second engagement features. In some cases, the first engagement features may have a different axial length than the second engagement features. In an example embodiment, the electrically isolated coupler may further include a sleeve disposed around radial edges of the drive body, the driven body and the torque transfer assembly, and around axial edges of the drive body and the driven body, to retain each of the drive body, the driven body and the torque transfer assembly after a failure according to the preferred failure mode. In some cases, a thickness of the torque transfer assembly may be between about 0.400" and 0.500".

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An electrically isolated coupler comprising:
   a drive body made of first metallic material and having a drive end configured to interface with a fastening component, the drive body comprising a first interface portion;
   a driven body made of a second metallic material and having a driven end configured to interface with a driving tool, the driven body comprising a second interface portion; and
   a torque transfer assembly disposed between the drive body and the driven body to electrically isolate the drive body and the driven body from each other and transfer torque between the drive body and the driven body;
   wherein the torque transfer assembly comprises non-conductive material configured to maintain separation between the drive body and the driven body of at least about 0.400",
   wherein the torque transfer assembly comprises a first isolation member and at least one second isolation member, and wherein the first and second isolation members are formed as disc or plate shaped members inserted between the drive body and the driven body,
   wherein the first isolation member and the at least one second isolation member are operably coupled to each other via reinforcement members; and
   wherein the reinforcement members include a first set of reinforcement members extending entirely through the first isolation member and into each of a first instance and a second instance of the at least one second isolation member, the first and second instances being disposed on opposite sides of the first isolation member.

2. The electrically isolated coupler of claim 1, wherein the torque transfer assembly comprises non-conductive metal.

3. The electrically isolated coupler of claim 2, wherein non-conductive metal forms a core member at an axial center of the torque transfer assembly.

4. The electrically isolated coupler of claim 2, wherein an entirety of the torque transfer assembly is formed from the non-conductive metal.

5. The electrically isolated coupler of claim 2, further comprising a foil layer disposed between the non-conductive metal and at least one of the drive body or the driven body.

6. The electrically isolated coupler of claim 1, wherein sides of each of the drive body and the driven body taper inwardly toward an axial center of the electrically isolated coupler as the drive body and the driven body extent toward each other to form tapered sides.

7. The electrically isolated coupler of claim 1, wherein the first interface portion is configured to interface with a first axial end of the torque transfer assembly, and wherein the second interface portion is configured to interface with a second axial end of the torque transfer assembly.

8. The electrically isolated coupler of claim 7, wherein the first interface portion has first engagement features and the second interface portion has second engagement features disposed on external surfaces thereof, and wherein the first and second engagement features are configured to define a preferred failure mode.

9. The electrically isolated coupler of claim 8, wherein the first engagement features have a different slope than the second engagement features, or wherein the first engagement features have a different axial length than the second engagement features.

10. The electrically isolated coupler of claim 8, wherein a thickness of the torque transfer assembly is between about 0.400" and 0.500".

11. The electrically isolated coupler of claim 7, further comprising a sleeve disposed around radial edges of the drive body, the driven body and the torque transfer assembly to retain each of the drive body, the driven body and the torque transfer assembly after a failure according to the preferred failure mode.

12. The electrically isolated coupler of claim 1, wherein the first isolation member and the at least one second isolation member are each made of different materials.

13. The electrically isolated coupler of claim 1, wherein the reinforcement members are disposed equidistant from each other and from an axial center of the electrically isolated coupler.

14. The electrically isolated coupler of claim 1, wherein the reinforcement members include a second set of reinforcement members, some of which extend between the first instance of the at least one second isolation member and the drive body and others of which extend between the second instance of the at least one second isolation member and the driven body.

15. The electrically isolated coupler of claim 14, wherein the first set of reinforcement members are disposed farther from an axial center of the electrically isolated coupler than the second set of reinforcement members.

16. An electrically isolated coupler comprising:
a drive body made of first metallic material and having a drive end configured to interface with a fastening component, the drive body comprising a first interface portion;
a driven body made of a second metallic material and having a driven end configured to interface with a driving tool, the driven body comprising a second interface portion; and
a torque transfer assembly disposed between the drive body and the driven body to electrically isolate the drive body and the driven body from each other and transfer torque between the drive body and the driven body;
wherein the torque transfer assembly comprises non-conductive material configured to maintain separation between the drive body and the driven body of at least about 0.400",
wherein sides of each of the drive body and the driven body taper inwardly toward an axial center of the electrically isolated coupler as the drive body and the driven body extent toward each other to form tapered sides, and
wherein the tapered sides include engagement features, and wherein engagement features of the drive body and the driven body are different from each other.

17. An electrically isolated coupler comprising:
a drive body made of first metallic material and having a drive end configured to interface with a fastening component, the drive body comprising a first interface portion;
a driven body made of a second metallic material and having a driven end configured to interface with a driving tool, the driven body comprising a second interface portion; and
a torque transfer assembly disposed between the drive body and the driven body to electrically isolate the drive body and the driven body from each other and transfer torque between the drive body and the driven body;
wherein the torque transfer assembly comprises non-conductive material configured to maintain separation between the drive body and the driven body of at least about 0.400",
wherein sides of each of the drive body and the driven body taper inwardly toward an axial center of the electrically isolated coupler as the drive body and the driven body extent toward each other to form tapered sides, and
wherein an axial thickness of the torque transfer assembly increases as distance from the axial center of the electrically isolated coupler increases.

\* \* \* \* \*